April 3, 1962     B. N. NAYDAN ETAL     3,028,550
ANALOG ACCELEROMETER FEEDBACK LOOP FOR DERIVING
VELOCITY INFORMATION IN DIGITAL FORM
Filed Sept. 9, 1959

BOB N. NAYDAN
RONALD Y. PARADISE
*INVENTOR.*

BY Andrew L. Bain
George J. Seligsohn

United States Patent Office 3,028,550
Patented Apr. 3, 1962

3,028,550
ANALOG ACCELEROMETER FEEDBACK LOOP FOR DERIVING VELOCITY INFORMATION IN DIGITAL FORM
Bob N. Naydan, Passaic, and Ronald Y. Paradise, Garfield, N.J., assignors to General Precision, Inc., a corporation of Delaware
Filed Sept. 9, 1959, Ser. No. 839,010
11 Claims. (Cl. 324—70)

This invention relates to analog to digital converter means and, more particularly, to means incorporated in the feedback loop of sensing means, such as an analog accelerometer, for deriving information in digital form.

In the field of automatic control, it is often desired to derive an output which bears a functional relationship with the magnitude of a measured physical quantity. By and large, sensing means for measuring the magnitude of a physical quantity are analog devices. However, the computing means for deriving secondary data from the sensed information are often digital devices. Thus, it is often necessary to insert analog to digital converter means between the sensing means and the computer means.

It is extremely important that such analog to digital converter means be highly accurate and reliable so that a minimum of error is introduced. However, due to noise or other causes, an analog to digital converter, which normally has a pulse output, may introduce a spurious pulse or suppress an information pulse, so that error is introduced into the overall system. Usually, there is no way to eliminate or compensate for such error.

In certain analog sensing means, such as an accelerometer, a restoring force proportional to the output thereof is fed back thereto through a feedback loop.

The present invention is concerned with such an analog sensing means, i.e., one incorporating a feedback loop.

Briefly, the present invention contemplates a feedback loop comprising analog to digital converter means for converting the analog output information of the sensing means to digital information in pulse form, and digital to analog converter means responsive to the digital information for obtaining an analog output which is fed back as an input to the sensing means. The digital information from the analog to digital converter means is also applied as an input to utilization means.

It will be seen that should the analog to digital converter means, due to noise or other cause, introduce a spurious pulse, the feedback input to the sensing means will be greater than it should be, which will result in reducing the output therefrom below that which would have been obtained if there had been no spurious pulse. Thus, over a period of time the erroneous information supplied by the spurious pulse will be compensated. In a similar manner, the lower feedback caused by the suppression of an information pulse will result in increasing the output from the sensing means above that which would have been obtained had the information pulse not been suppressed. Thus, over a period of time, the erroneous information caused by the absence of an information pulse will also be compensated.

It is therefore an object of this invention to provide an improved analog to digital converter means.

It is a further object of this invention to provide a digital representation of velocity derived from an analog accelerometer.

It is a further object of this invention to incorporate analog to digital converter means in the feedback loop of analog sensing means, such as an accelerometer.

These and other objects, features and advantages of the present invention will become apparent from the following detailed description taken together with the accompanying drawing in which:

The sole figure is a block and schematic diagram of a preferred embodiment of the invention.

Referring now to the drawing, accelerometer 102 has an A.C. excitation input 104 applied thereto from a source (not shown). In response to an acceleration, an A.C. output signal 106 having an amplitude and phase proportional to the magnitude and direction of acceleration is picked off accelerometer 102 and applied as a first input to amplifier and demodulator 108. An A.C. reference input 110 is applied as a second input to amplifier and demodulator 108 from a source (not shown). Amplifier and demodulator 108 may include lead-lag networks for loop stabilization purposes.

Amplifier and demodulator 108 provides a D.C. output 112 having a magnitude proportional to the magnitude of the acceleration sensed by accelerometer 102 and a polarity determined by the direction of acceleration, i.e, positive for acceleration and negative for deceleration.

D.C. output 112 is applied as a first input to pulse duration modulator 114. Sawtooth generator 116 provides a periodic sawtooth wave output 118 at a relatively low frequency, such as 2 kc., for instance, which is applied as a second input to pulse duration modulator 114.

Pulse duration modulator 114 is any means well known in the art for producing a pulse having a width or duration in accordance with the magnitude of a D.C. input applied thereto. More specifically, pulse duration modulator 114 may, for example, include means for summing D.C. output 112 and sawtooth wave output 114 and controlling a switching device by the zero crossings of the resultant wave forms. In response to D.C. output 112 having a positive polarity, pulse duration modulated pulses, such as indicated by reference numeral 120, are derived on first output means 122 of pulse duration modulator 114. In response to D.C. output 112 having a negative polarity, pulse duration modulated pulses are derived on second output means 124 of pulse duration modulator 114.

Pulse duration modulator 114 is biased such that, in response to the magnitude of D.C. output 112 being zero, narrow pulse duration modulated pulses of equal duration are derived on both first and second output means 122 and 124. In response to D.C. output 112 having a positive magnitude, the pulse duration modulated pulse derived on second output means 124 narrows still further, so that when the positive magnitude of D.C. output 112 reaches a small positive threshold value the pulse modulated pulse on second output means 124 is eliminated altogether. In a similar manner, the pulse modulated pulse on first output means 122 is eliminated altogether when the negative magnitude of D.C. output 112 reaches a small negative threshold value.

The pulse duration modulated pulses derived on first output means 122 are applied, as shown as first inputs to on gate 126 and off gate 128, respectively. The pulse duration modulated pulses derived on second output means 124 are applied, as shown, as first inputs to on gate 130 and off gate 132.

Clock pulse generator 134, which may be the clock pulse generator of a digital computer, not shown, utilizing the digital output of the present invention, supplies highly accurate clock pulse output 136 at a relatively high frequency, such as 400 kc., as a second input to on gate 126, off gate 128, on gate 130 and off gate 132.

On gate 126 is normally off and is gated on only during the duration of a duration modulated pulse from first output means 122. Of gate 128 is normally on and is gated off only during the duration of a duration modulated pulse from first output means 122. On gate 130 is normally off and is gated on only during the duration of a duration, modulated pulse from second output means 124. Off gate 132 is normally on and is gated off only during the duration of a duration modulated pulse from second output means 124.

Therefore, on gate 126, passes clock pulses only during the presence of a duration modulated pulse from first output means 122; on gate 130 passes clock pulses only during the presence of a duration modulated pulse from second output means 124; off gate 128 passes clock pulses except during the presence of a duration modulated pulse from first output means 122; and off gate 132 passes clock pulses except during the presence of a duration modulated pulse from second output means 124.

The clock pulses passed by on gate 126, which appear as indicated by reference numeral 138, are applied as an up input 140 to up and down counter 142. The clock pulses passed by on gate 130 are applied as a down input 144 to up and down counter 142.

Up and down counter 142 registers a count which is equal to the difference between the total number of clock pulses applied as an up input 140 thereto and the total number of clock pulses applied as a down input 144 thereto.

Since velocity is equal to the time integral of acceleration, the count registered by up and down counter 142 expresses velocity in digital form. This registered count is applied as output 146 of up and down counter 142 to utilization means, such as a digital computer, not shown.

The clock pulses passed by on gate 126 are also applied as set input 148 to "+" flip-flop 150 and the clock pulses passed by on gate 130 are also applied as set input 152 to "−" flip-flop 154. Flip-flops 150 and 154 may be bistable multivibrators, for example. The clock pulses passed by off gate 128 are applied as reset input 156 to "+" flip-flop 150 and the clock pulses passed by off gate 132 is applied as reset input 158 to "−" flip-flop 154.

In response to the first clock pulse applied to set input 148 of "+" flip-flop 150 during the presence of a duration modulated pulse, "+" flip-flop 150 is switched to its set position. Additional clock pulses applied to set input 148 have no effect since "+" flip-flop 150 is already in its set position. In response to the first clock pulse applied to reset input 156 of "+" flip-flop 150 immediately following the termination of a duration modulated pulse, "+" flip-flop 150 is switched to its reset position. Additional clock pulses applied to reset input 156 have no effect, since "+" flip-flop 150 is already in its reset position.

"+" flip-flop 150 produces an output 160 during the period "+" flip-flop 150 is in its set position. It will be seen that output 160 will be a pulse having a duration which is an integral multiple of the clock pulse period.

In a smiliar manner, "−" flip-flop 154 will produce a pulse output 162 which also has a duration which is an integral multiple of the clock pulse period.

Regulated power supply 164 includes a positive output 166 of given magnitude which is applied as an input to D.C. amplifier 168 through resistances 170 and 172 and a negative output 174 of the same given magnitude which is applied as an input to D.C. amplifier 168 through resistances 176 and 178.

The junction of resistances 170 and 172 is shorted to a point of zero reference potential through normally conducting "+" gated current switch 180, and the junction of resistance 176 and 178 is shorted to a point of zero reference potential through normally conducting "−" gated current switch 182, so that normally no voltage appears at the input to D.C. amplifier 168.

"+" and "−" gated current switches 180 and 182 may consist of transistors arranged to be normally conductive.

Pulse output 160 is applied as a control input to "+" gated current switch 180 to cut-off "+" gated current switch 180 during the presence of pulse output 160. This results in a constant amplitude positive pulse derived from output 166 being actually applied to the input of D.C. amplifier 168 during the presence of pulse output 160, and a constant amplitude negative pulse derived from output 174 being actually applied to the input of D.C. amplifier 168 during the presence of pulse output 162. The constant amplitude positive and negative pulses, although differing in polarity, will be of the same magnitude.

D.C. amplifier 168 is a feedback amplifier which provides a D.C. output 184 which is proportional to the average energy applied as an input thereto. Reference numeral 186 represents a positie D.C. output 184, which may be provided by D.C. amplifier 168. D.C. output 184 is fed back to the restoring coil of accelerometer 102, which applies a restoring force to accelerometer 102 which is proportional to D.C. output 184.

Accelerometer 102 is damped in accordance with the restoring force, so that the amplitude of signal 106 is effectvely lowered in accordance with the magnitude of D.C. output 184.

From the foregoing, it will be seen that the feedback loop for accelerometer 102 consists of an analog to digital converter comprising elements 108, 114, 116, 126, 128, 132, and 134, and a digital to analog converter comprising elements 150, 154, 164, 168, 170, 172, 176, 178, 180, and 182. The digital information provided by the analog to digital converter is utilized by utilization means including up and down counter 142.

If the described circuit is operating properly, so that the digital informatio in pulse form emerging from the analog to digital converter correctly manifests the magnitude of A.C. output 106, the magnitude of D.C. output 184 emerging from the digital to analog converter, which manifests in analog form the digital information applied thereto, will be proportional to the magnitude of A.C. output 106. Therefore, the damping provided by the restoring force will be proportional to the magnitude of A.C. output 106.

However, if for any reason, the digital information in pulse form emerging from the analog to digital converter should ever manifest a magnitude greater than the magnitude of A.C. output 106, the magnitude of D.C. output 184 will also be greater than it should be. This will result in greater damping, so that the magnitude of A.C. output 106 will be lowered below the value it would have had if the digital information from the analog to digital converter had manifested the correct magnitude of A.C. output 106. Therefore, the succeeding digital information will be lower than it otherwise would be, thereby compensating for the original error.

In a similar manner, the feedback loop will compensate for an error in which the digital information manifests a magnitude smaller than the magnitude of A.C. output 106.

Thus, it will be seen that by inserting the analog to digital converter in the feedback loop of accelerometer 102, a more accurate and reliable device is obtained.

It might be pointed out that because of this self-correcting feature, described above, high accuracy and resolution may still be obtained, even if a pulse durati on modulator 114 and a sawtooth generator 116 of relatively low accuracy are utilized.

Although only a preferred embodiment of the present invention has been described herein, it is not intended that the invention be restricted thereto, but that it be limited only by the true spirit and scope of the appended claims.

We claim:
1. A device for providing a digital output to utilization means, comprising in combination;
  sensing means for producing an output which is an analog of the magnitude of a sensed physical quantity;
  analog to digital converter means, including first means responsive to the output of said sensing means for deriving a duration modulated pulse having a duration in accordance with the magnitude of a sensed physical quantity, a relatively high frequency clock pulse generator, and second means coupled to said first means and said clock pulse generator for passing clock pulses only during the duration of a duration modulated pulse so that the number of clock pulses passed by said second means manifests in digital form the magnitude of said sensed physical quantity;

means for applying the output of said sensing means as an input to said analog to digital converter means to derive an output therefrom which manifests the magnitude of said sensed physical quantity in digital form;

means for applying the output of said analog to digital converter means as an input to said utilization means;

digital to analog converter means;

means for also applying the output of said analog to digital converter means as an input to said digital to analog converter means to derive an output therefrom which manifests the magnitude of said sensed physical quantity in analog form; and means for feeding back the output of said digital to analog converter means as a damping input to said sensing means, whereby, if the device is operating properly so that the digital information emerging from the analog to digital converter means correctly manifests the magnitude of the sensed physical quantity, the magnitude of the output emerging from the digital to analog converter means and which is applied as an input to said sensing means will be proportional to the magnitude of the sensed physical quantity, whereas if the digital information emerging from the analog to digital converter manifests a magnitude greater than the magnitude of the sensed physical means, the magnitude of the output of the digital to analog converter means applied as an input to said sensing means will also be greater than it should be resulting in greater damping, changing the output from said sensing means and compensating for the original error.

2. The combination defined in claim 1, wherein said first means includes a saw-tooth wave generator operating at a relatively low frequency, and a pulse duration modulator coupled to said saw-tooth wave generator and said sensing means for initiating and terminating a duration modulated pulse in response to the sum of the instantaneous values of the output of said sensing means and said saw-tooth wave having a predetermined value.

3. The combination defined in claim 1, wherein said first means includes first output means from which a duration modulated pulse is derived in response to the magnitude of said sensed physical quantity being positive, and second output means from which a duration modulated pulse is derived in response to the magnitude of the sensed physical quantity being negative, and wherein said second means includes first gate means coupled to said first output means for passing clock pulses only during the duration of a duration modulated pulse from said first output means, and second gate means coupled to said second output means for passing clock pulses only during the duration of a duration modulated pulse from said second output means.

4. The combination defined in claim 3, wherein said first means operates periodically to successively derive duration modulated pulses, and wherein said utilization means comprises an up and down counter having an up input coupled to said first gate means and responsive to the clock pulses passed thereby and a down input coupled to said second gate means and responsive to the clock pulses passed thereby, whereby the count registered by said up and down counter manifests the time integral of the magnitude of the sensed physical quantity.

5. The combination defined in claim 4, wherein said sensing means is an accelerometer and the sensed physical quantity is acceleration, whereby the count registered by said up and down counter manifests velocity.

6. The combination defined in claim 1, wherein said digital to analog converter means comprises third means coupled to said second means for initiating a constant amplitude feedback pulse response to the first clock pulse passed by said second means when a duration modulated pulse is applied thereto and terminating said feedback pulse in response to the first clock pulse occurring after the termination of said duration modulated pulse, a D.C. amplifier for deriving a D.C. output proportional to the energy contained in a pulse applied as an input thereto, means for applying said feedback pulse as an input to said D.C. amplifier, and means for feeding back the D.C. output of said D.C. amplifier as an input to said sensing means.

7. The combination defined in claim 6, wherein said first means includes first output means from which a duration modulated pulse is derived in response to the magnitude of said sensed physical quantity being positive, and second output means from which a duration modulated pulse is derived in response to the magnitude of said sensed physical quantity being negative, wherein said second means comprises first gate means coupled to said first output means for passing clock pulses only during the duration of a duration modulated pulse from said first output means, second gate means coupled to said second output means for passing clock pulses only during the duration of a duration modulated pulse from said second output means, third gate means coupled to said first output means for passing clock pulses except during the duration of a duration modulated pulse from said first means, and fourth gate means coupled to said second output means for passing clock pulses except during the duration of a duration modulated pulse from said second output means, and wherein said third means comprises first and second flip-flops, means for applying the output of said first gate means as a set input to said first flip-flop to switch said first flip-flop to a set position, means for applying the output of said third gate means as a reset input to said first flip-flop to switch said first flip-flop to a reset position, means for applying the output of said second gate means as a set input to said second flip-flop to switch said second flip-flop to a set position, means for applying the output of said fourth gate means as a reset input to said second flip-flop to switch said second flip-flop to a reset position, a regulated power supply having respective positive and negative polarity outputs, first switch means controlled by said first flip-flop for applying one polarity output of said power supply as an input to said D.C. amplifier only when said first flip-flop is in its set position, and second switch means controlled by said second flip-flop for applying the other polarity output of said power supply as an input to said D.C. amplifier only when said second flip-flop is in its set position.

8. The combination defined in claim 7, wherein said one polarity is positive and said other polarity is negative.

9. The combination defined in claim 7, wherein the said first means provides simultaneous pulse duration modulated pulses of equal duration on both said first and second output means in response to the magnitude of said sensed physical quantity being zero.

10. The combination defined in claim 7, wherein said sensing means is an accelerometer having a restoring coil and said sensed physical quantity is acceleration, and wherein the output of said D.C. amplifier is applied as an input to said restoring coil.

11. The combination defined in claim 10, wherein said utilization means comprises an up and down counter, means for applying the output of said first gate means as an up input to said up and down counter and means for applying the output of said second gate means as a down input to said up and down counter, whereby the count registered by said up and down counter manifests velocity.

References Cited in the file of this patent

UNITED STATES PATENTS

| | | |
|---|---|---|
| 2,787,418 | McKnight | Apr. 2, 1957 |
| 2,836,356 | Forrest | May 27, 1958 |
| 2,865,564 | Kaiser | Dec. 23, 1958 |
| 2,904,681 | Jones | Sept. 15, 1959 |
| 2,953,773 | Nicolantonio | Sept. 20, 1960 |
| 2,960,690 | Curtis | Nov. 15, 1960 |
| 2,988,737 | Schroeder | June 13, 1961 |